Feb. 10, 1942.  R. L. WILCOX ET AL  2,272,758
TRANSFER MECHANISM
Filed Feb. 14, 1941   5 Sheets-Sheet 1

INVENTORS
RICHARD L. WILCOX
HERBERT L. HOYT
BY
ATTORNEY

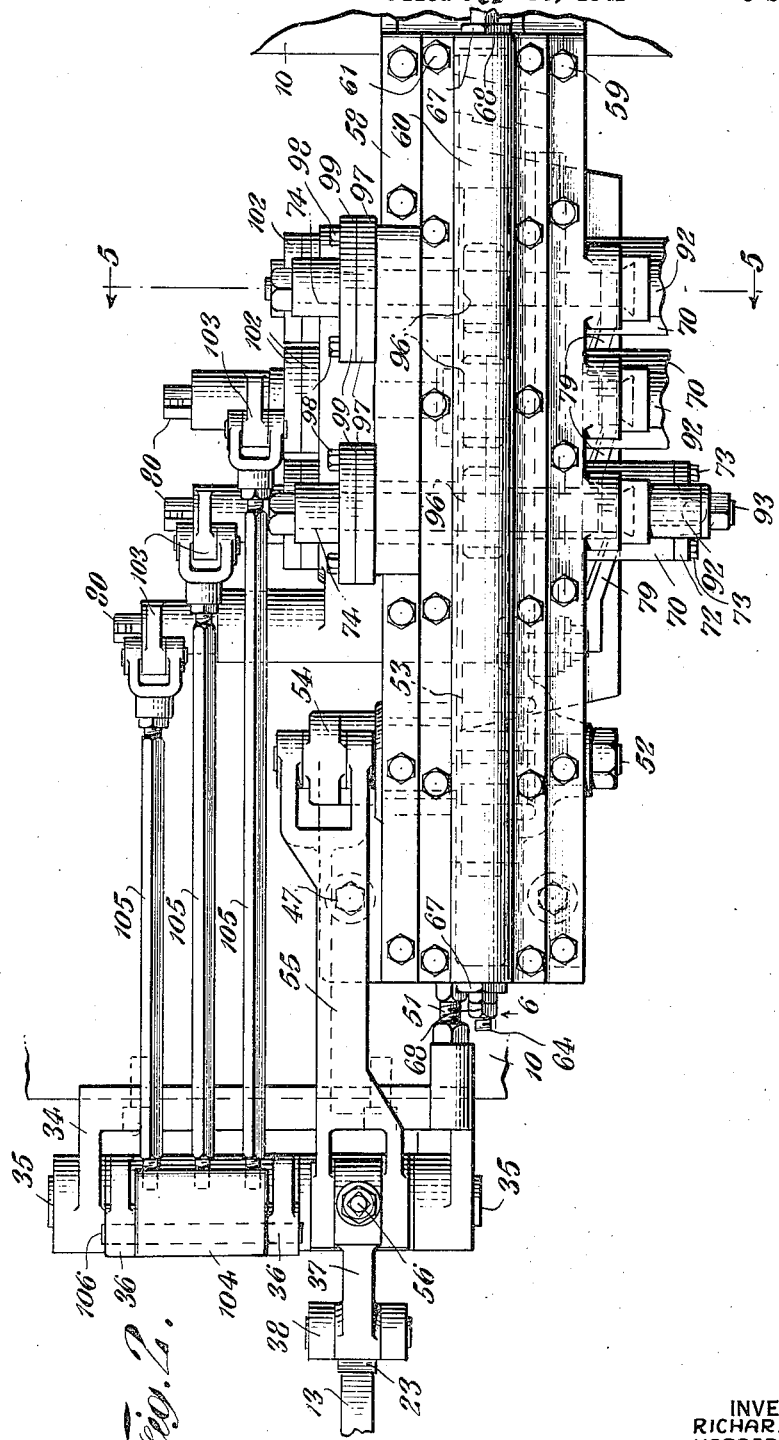

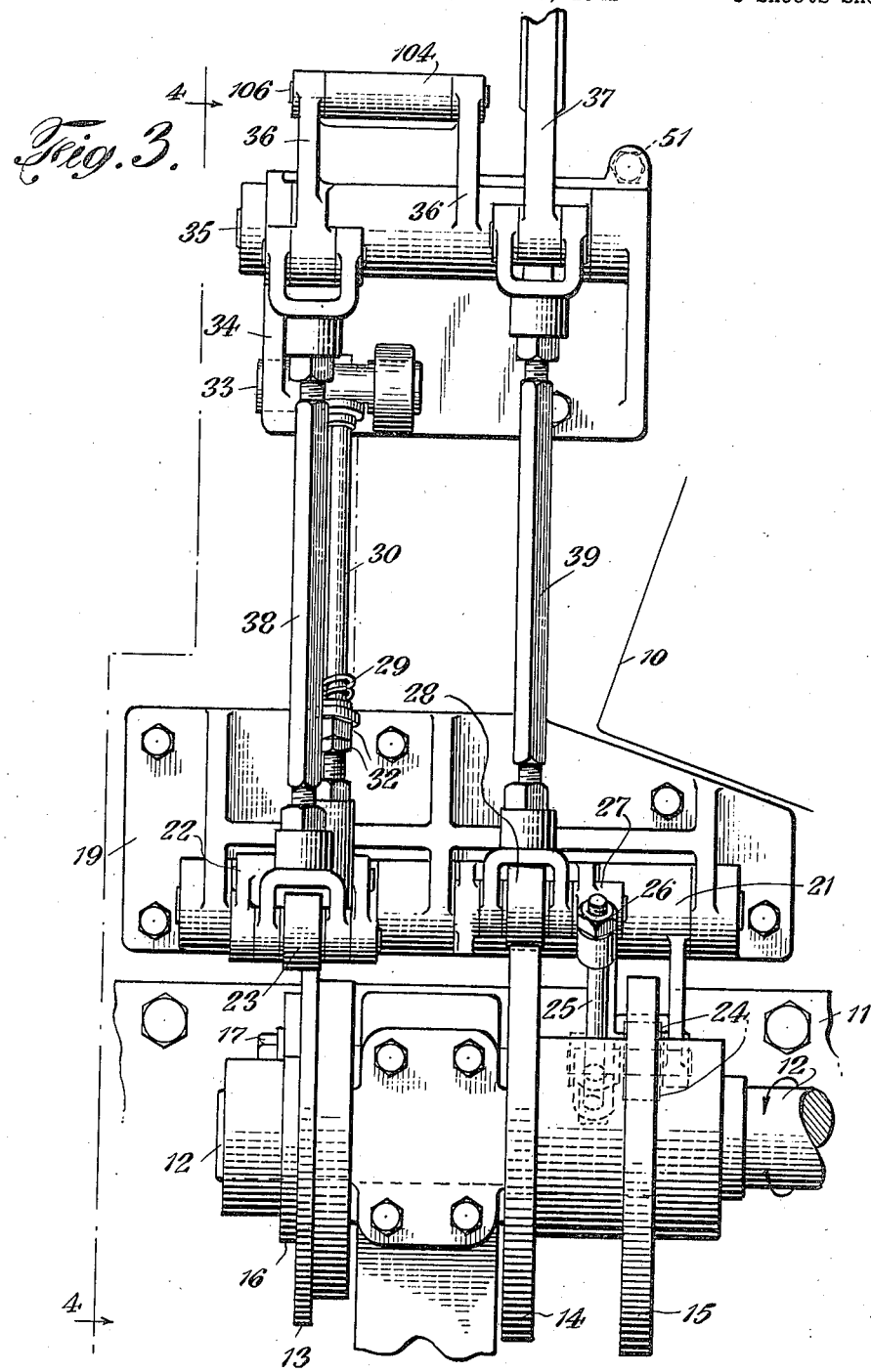

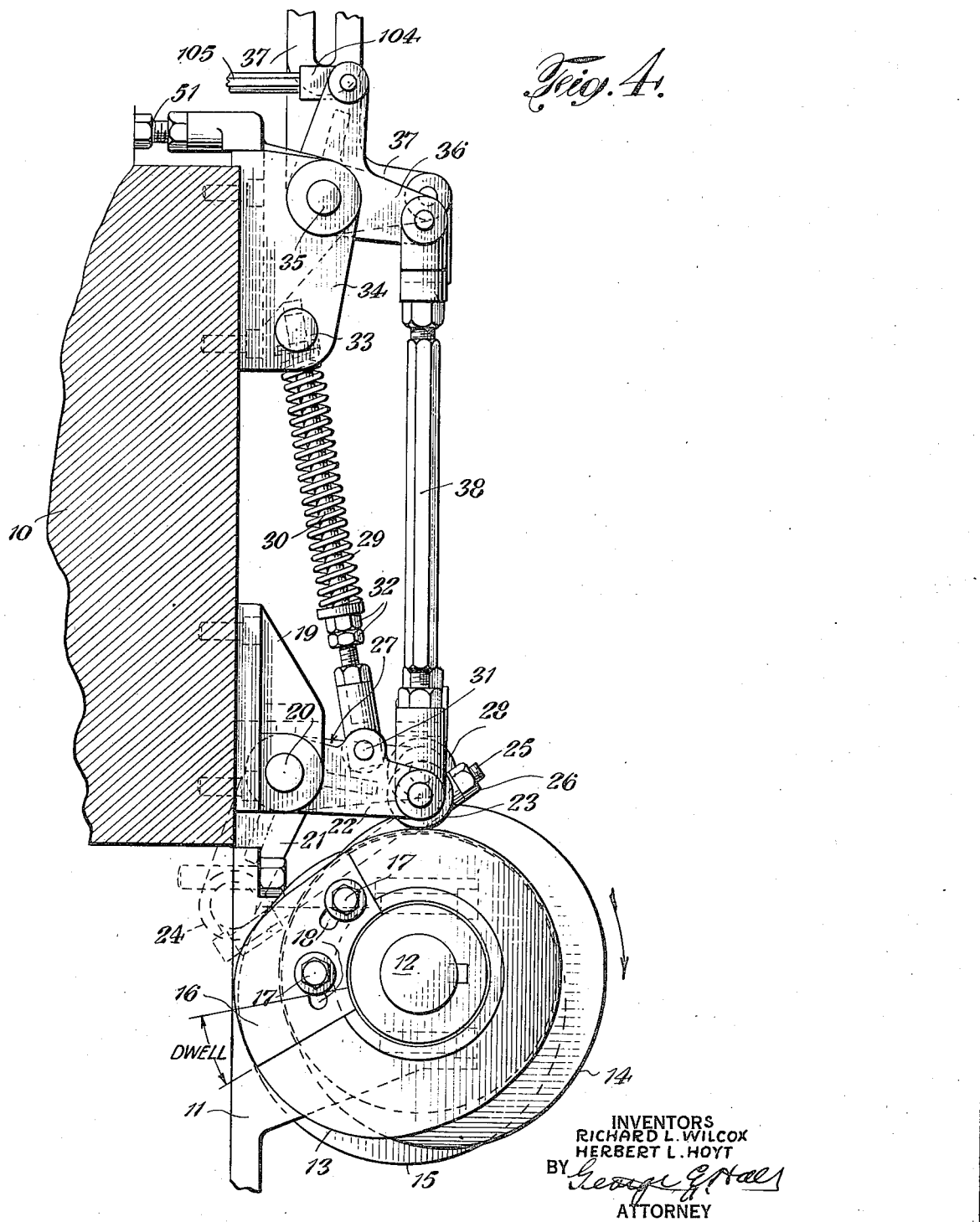

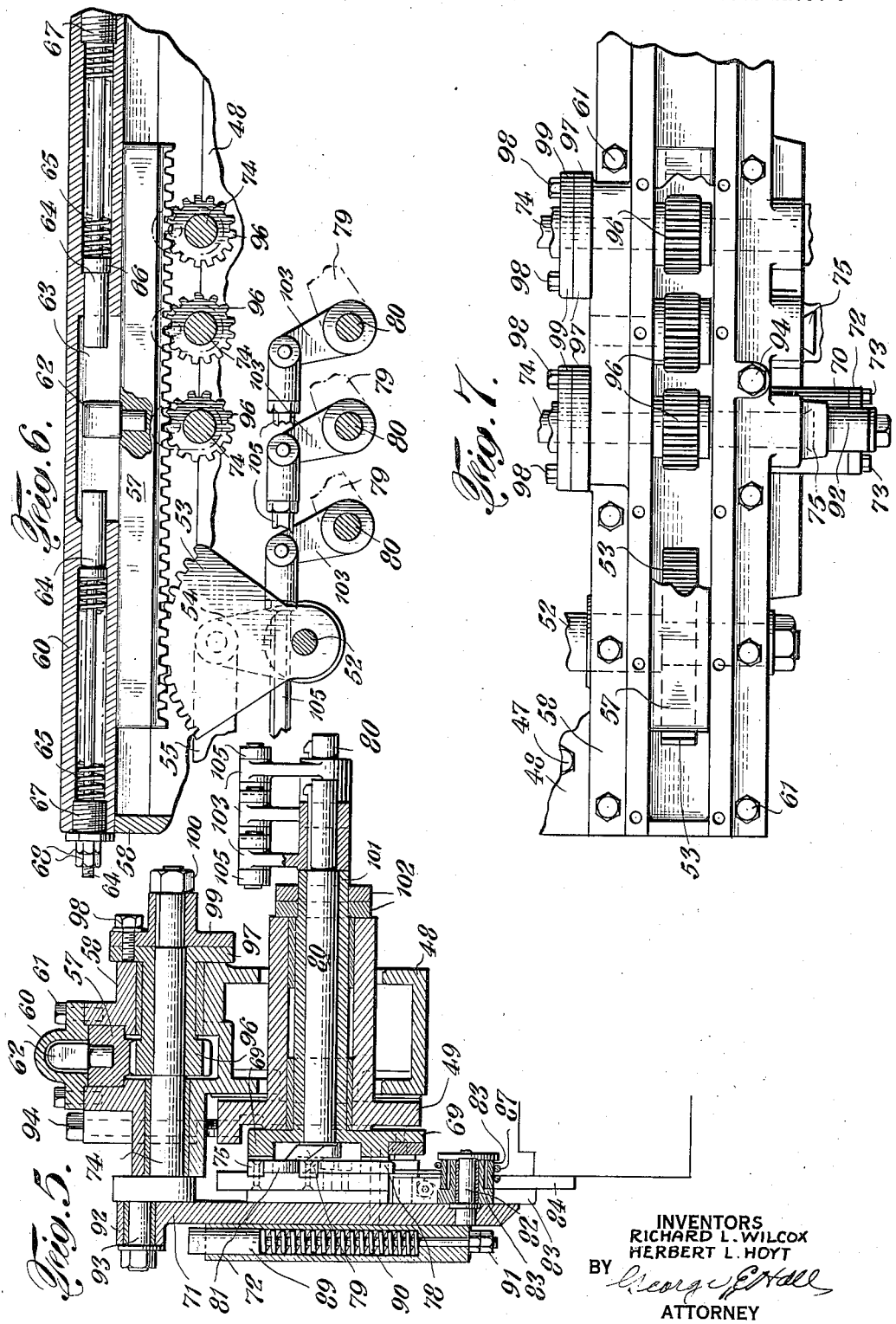

Patented Feb. 10, 1942

2,272,758

UNITED STATES PATENT OFFICE 2,272,758

TRANSFER MECHANISM

Richard Lester Wilcox and Herbert L. Hoyt, Waterbury, Conn., assignors to The Waterbury Farrel Foundry and Machine Company, Waterbury, Conn., a corporation of Connecticut Application February 14, 1941, Serial No. 378,918

29 Claims. (Cl. 10—12)

This invention relates to new and useful improvements in transfer mechanism, particularly as used with headers, upsetting machines or the like having a plurality of operating stations, for carrying a workpiece from one of such stations to another. While this is the type of machine with which the mechanism is generally used it is not limited, however, to such use.

A principal object of this invention is to provide mechanism to successively transfer workpieces from one station to another by a plurality of transfer units, these being preferably independently operated; another object being to arrange for opening and closing the carrying tongs or fingers at different times, either earlier or later than the tongs or fingers of other units, the extent of the openings being variable, and the timing of the several pairs of tongs or fingers and the operation thereof being acomplished by independent mechanisms; a further object being to provide an independent adjustment of parts that will insure a central position of the fingers at both the receiving and discharge stations; a further object being to subject the tongs or fingers to a yielding pressure near the limit of their stroke at the discharge station; a further object being to so construct and operate the mechanism that the workpiece will be transferred quickly from one station to another and securely grasped and quickly released at separate stations through positively actuated elements as distinguished from the conventional type of fingers that spring over the workpiece and hold it entirely by spring tension; a further object being to provide transfer mechanism that will function irrespective of the diameter and space occupied by the tools or the changing shape and diameter of the workpiece at the several stations. A further object of the invention is to so arrange the several parts that they may be assembled as a unit apart from the header or upsetting machine, and thereafter separably fixed thereto and removed therefrom.

Other objects of this invention and its construction and operation will appear from the following description and accompanying drawings, wherein a preferred embodiment of the invention is disclosed. Other forms and embodiments may be adapted to obtain the purposes and objects of this invention equally as well as the one herein shown.

In the accompanying drawings, wherein like numerals of reference indicate like parts in the several figures;

Figure 2 is a fragmentary plan view thereof;

Figure 3 is a view on an enlarged scale of another portion thereof, looking toward the outside of Figure 4;

Figure 4 is a section thereof as viewed generally from the position of the vertical plane indicated by line 4—4 of Figure 3;

Figure 5 is a sectional view of one of the transfer units, the parts in section being taken generally upon line 5—5 of Figure 2;

Figure 6 is a fragmentary detail view of the rack mechanism and associated parts, the parts in section being taken generally upon line 6—6 of Figure 2; and Figure 7 is a fragmentary plan view of the parts shown generally in Figure 6 with the cap and associated parts removed.

Figure 1:
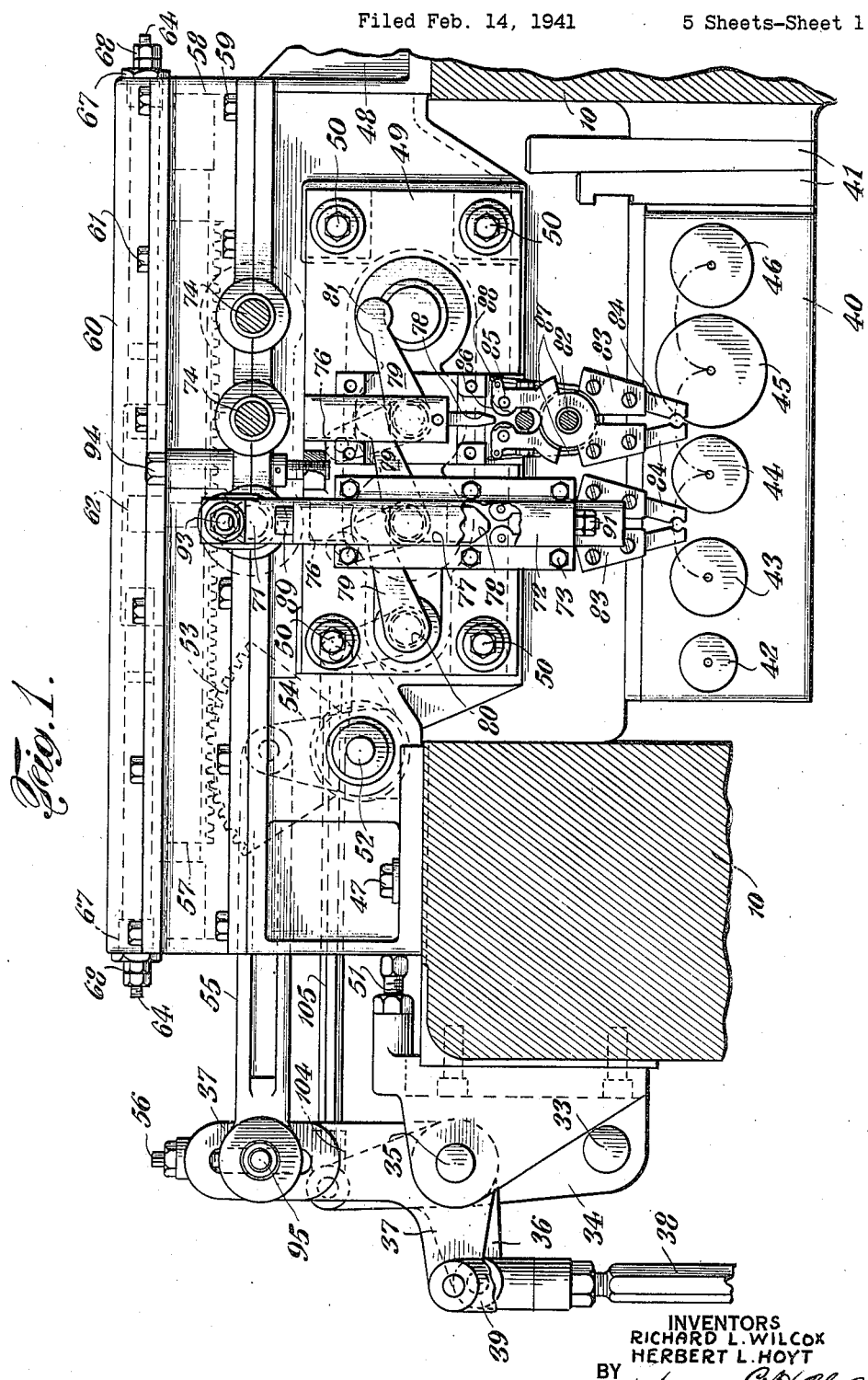
Figure 1 is a transverse sectional view of a portion of a conventional header, upsetting machine or the like, with this improved transfer mechanism associated therewith.

This invention contemplates the use of a plurality of transfer units. In Figure 1 two of such units are shown and the third has been omitted. The transfer unit at the left of Figure 1 is shown complete but with a portion of its cap or cover broken away to disclose parts of the fingers and the means for separating the fingers. The one at the right is shown with the cap or cover removed. More or less of these transfer units may be used within the spirit of this invention. As the details of the transfer units are generally shown and disclosed in an application therefor filed by the applicants herein, and designated Transfer mechanism, these units will not be described more in detail herein than is necessary to disclose their use and application in connection with this invention.

In the drawings the numeral 10 designates a body or frame of an upsetting machine or the like; 11 a bracket fixed thereto, in which is journaled a shaft 12, having fixed thereon slide cam 13, transfer cam 14 and follow cam 15. On one face of the cam 13 a cam piece 16 is adjustably secured by the bolts 17 which pass through elongated slots 18.

Secured to the frame 10 is a bracket 19, in which is a stud 20 that provides a fulcrum for the rock levers 21 and 27, the outer ends of which carry cam rolls 28 and 24, which ride respectively upon the faces of cams 14 and 15 and are maintained in this relative position by a tie rod 25. The nut 26 on this tie rod provides for a relative adjustment of the spacing of cam rolls 24 and 28. Also fulcrumed on the stud 20 is the rock lever 22, carrying a cam roll 23, which rides on the face of cam 13. The roll 23 is held in engagement with the cam 13 by a compression spring 29 surrounding a spring pin 30 that is pivotally connected at one end to the lever 22 by the pin 31, and projects at the other end through a swivel pin 33. Adjustment of the tension of this spring is obtained through manipulation of the nuts 32. In the bracket 34 fixed to the frame is a stud 35, upon which is journaled the bell crank levers 36 and 37, the former being operatively connected with the lever 22 by the adjustable connecting rod 38, and the bell crank lever 37 is adjustably connected with the lever 21 by the adjustable connecting rod 39.

Held securely within the frame 10 by the wedges 41 or the like, is a die block 40, having mounted therein a series of dies, as shown, five in number, and severally designated 42, 43, 44, 45 and 46. The die 42 is the cut-off die, and dies 43 to 46, inclusive, are working dies, which may be for heading, trimming, forming, piercing, or any other operation, or combination thereof upon a workpiece, arranged as may best suit the operations to be performed. Some workpieces may require heading and trimming and others only heading, and vice versa, and some may require a piercing operation, while others may not. Working dies are designed and used for an operation most convenient in the fabrication of an article from a workpiece.

Each of the transfer units consists generally of a swivel head 69 rotatably mounted in the plate 49. On this swivel head is a slide block 70, within which a transfer slide 71 is reciprocated and held in disengagement therefrom by the cap 72. The screws 73 secure both the cap 72 to the slide block and the latter to the swivel head. Each transfer slide 71 is reciprocated through the rotation of a crank shaft 74 and an oscillating movement is also thereby imparted to the swivel head 69. In the swivel head 69 is a tong slide 75, having thereon the blocks 76 and 77 spaced from each other, the latter having a pointed end with converging cam faces 78. This slide acquires a reciprocatory motion in the swivel head 69 through the rock levers 79 fixed on the shafts 80 and having a ball end 81 in the open space between the blocks 76 and 77, and in engagement with both, substantially as shown in Figure 1. The tong slide 75 has an independent movement in the swivel head 69, derived as hereinafter described.

In the transfer slide 71 is a pin 82, which carries the tong jaws or fingers 83, to which are secured the gripping fingers 84, recessed or otherwise formed at their lower ends to accommodate the workpiece to be engaged thereby. These tongs operate very similarly to a pair of ordinary shears. The tail or rear end of these tongs is upon the side of the pin 82 opposite to the fingers 84. In the tail of each finger is a stud 85, upon which is a cam roll 86. As the slide 75 moves endwise in the swivel head toward the tongs, the cam faces 78 are projected between the rolls 86 and thus separate the fingers 83. The tong jaws or fingers 83 are moved to their closed position by a spring 87 or the like, which encircles the hub of the tongs and presses against the pin 88 fixed in the tong tails.

In the cap 72 is a spring pin 89 which is normally thrust in one direction by a coil spring 90, such movement being limited by nuts 91. The spring pin 89 is in the path of the hub 92 on the transfer slide on each down position of the crank pin 93, that is, when receiving a workpiece at one station and delivering the same workpiece at another station. The purpose of this spring pin 89 is to take up any lost motion between the tongs and other operating parts from that portion of the stroke of the transfer slide 71 when it is essential that the fingers should correctly register at a predetermined time with other operating parts. Thus the tong slide is under spring pressure only at the last portion of each downward stroke.

Secured to the frame by bolts 47 or the like, and straddling an open space between two walls of the frame, is a bracket 48. Upon the face of this bracket, the plate 49 is adjustably secured by screws 50 or the like, which project through enlarged holes in the plate and threaded into the bracket 48. Horizontal adjustment of the bracket 48 is acquired through the screws 51 at opposite ends of the bracket (only one being shown) rotatable in a fixed part and bearing against a wall of the bracket, substantially as shown in Figure 1, and secured in its adjusted position by means of the bolts 47. Vertical adjustment is acquired through manipulation of the adjusting screws 94 threaded into a lug at the top of the plate. By the adjustment described the transfer units are all shifted as a unit with the plate 49.

Secured to the rock shaft 52, journaled in the bracket 48, is a segment gear 53 and an arm 54, between which and the bell crank lever 37 is the connection rod 55. This rod is adjustable radially in the lever 37 by the screw 56, which is threaded through the journal pin 95 and functions in a well known manner. By this adjustment the stroke of the segment gear 53 is varied. The teeth of segment gear 53 mesh into those in a rack 57, slidably mounted in a frame 58, secured to the bracket 48 by bolts 59 or the like. A cap 60 is secured to the frame 58 by the bolts 61 or the like. Fixed in the rack 57 is a pin 62 which projects into a chamber 63 in the cap 60. Mounted in the opposite ends of the cap 60 are the spring pins 64, each being under the tension of a spring 65, which thrust the inner ends of the pins 64 toward each other until limited by a collar 66. The outer ends of the pins 64 project through hollow screws 67 and threaded thereon are the adjusting nuts 68. At the substantial limit of the stroke of the reciprocating rack at each movement, the pin 62 engages one of the pins 64 and moves the same slightly against the tension of the spring 65. This action takes up all the slack, wear and lost motion, if any, of the parts and assures uniform length successive strokes of the rack.

Journaled within the bracket 48 and frame 58 are the pinions 96, the teeth of which mesh into those of the rack 57. By reason of this connection, each of the crank shafts 74 is oscillated simultaneously. On each of the three crank shafts 74 a pinion 96 is keyed or otherwise secured. The pinion 96 associated with each of the crank shafts, on opposite sides of the center crank shaft, is provided with a flange 97 that is clamped by screws 98 to a flange 99 secured by a key, or otherwise, to the crank shaft. The nut 100 prevents endwise movement of the shaft and associated parts. This arrangement of parts provides for an independent adjustment for each of the crank pins 93, whereby each crank pin will be positioned so as to bring the transfer fingers central with the die at both the receiving and discharge stations. The rock shaft 80 on the left, as viewed in Figure 1, is journaled in the bracket 48, and the other two are journaled in the hub 101 of the swivel head 69 (Fig. 5), which hub is held against endwise movement by the collars 102.

One the outer end of each of the shafts 80 is secured a rock arm 103, and these are each separately connected with the intermediate member 104 by an adjustable rod connection 105. The member 104 is pivotally connected with the bell crank lever 36 by the pintle 106. By adjusting the lengths of the rods 105, the cam piece 78 can be adjusted so as to open or close one pair of the tongs or gripping fingers, either earlier or later than another pair of tongs or fingers, and independently thereof. Thus one pair of fingers may be opened a substantial distance to permit a relatively large punch to pass therebetween at one station, while at another station the fingers may be opened only a limited distance to permit the passage therebetween of a relatively small tool, or to adapt itself for the change in the size and shape of the workpiece resulting from successive operations of tools thereon at the several stations. Again, at one station it may be desirable that the fingers remain closed for a long time, holding the workpiece for the punch, which in fact may not be any larger than the workpiece itself. The extent of the opening for the fingers may be varied by the shape and size of the cam block 77. In Figure 1, the cam block 77, of transfer unit on the left, is wider than in the transfer unit to the right, hence the fingers are opened wider in the former than in the latter.

The foregoing description is directed solely toward the construction illustrated, and it is to be understood that the privilege of resorting to all mechanical changes to which the device is suitable, is reserved, the invention being defined and limited only by the scope of the appended claims.

What is claimed is:

1. In a transfer mechanism; a plurality of transfer units, each unit having a head member; a carrying member thereon; fingers movably mounted upon the carrying member; means for synchronously moving the carrying member of each transfer unit relatively to the head member and thereby oscillating each head member; and positively actuated independent means for separately actuating the fingers and in part movable with the head member.

2. In a transfer mechanism; a plurality of transfer units, each unit having a head member; a carrying member thereon; fingers movably mounted upon the carrying member; means for synchronously moving the carrying member of each transfer unit relatively to the head member thereby oscillating each head member; and positively actuated independent means for separately actuating the fingers of each transfer unit and in part movable with the head member.

3. In a transfer mechanism; a plurality of tool stations; an oscillating member movable about a center intermediate of each of said stations for transferring a workpiece from one station to another station; a carrying member movably mounted on each oscillating member; fingers connected with each carrying member; means for synchronously actuating all of said carrying members; and independently actuated mechanism for separately actuating the fingers upon each carrying member and in part movable with the oscillating member.

4. In a transfer mechanism; a plurality of tool stations; an oscillating member movable about a center intermediate of each of said stations for transferring a workpiece from one station to another station; a carrying member movably mounted on each oscillating member; fingers connected with each carrying member; means for synchronously actuating all of said carrying members and independently actuated mechanism for separately actuating the fingers upon each carrying member, either at the same time or at different times at different stations.

5. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously moving all of said carrying members relatively to the oscillating member and independent mechanism in part movable with the oscillating member for separately actuating the fingers upon each carrying member and adjustable relatively to the fingers and whereby the relative timing of the opening and closing of the fingers at each station and the extent of separation of said fingers at each station may be varied.

6. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members; independently actuated mechanism for separately actuating the fingers upon each carrying member; and means for yieldingly resisting the action of said fingers as they approach the stations.

7. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members; independently actuated mechanism for separately actuating the fingers upon each carrying member; and means for yieldingly resisting the action of said fingers as they approach said station, comprising in part a spring member in the path of the carrying member and engaged thereby near the limits of its stroke.

8. In a transfer mechanism; a plurality of tool stations; an oscillating member movable about a center intermediate of each of said stations for transferring a workpiece from one station to another station; a carrying member movably mounted in each oscillating member; fingers connected with each carrying member; means, comprising in part gear and rack mechanism for synchronously actuating all of said carrying members; and independently actuated mechanism in part moving with the oscillating member for separately opening the fingers.

9. In a transfer mechanism; a plurality of tool stations; an oscillating member movable about a center intermediate of each of said stations for transferring a workpiece from one station to another station; a carrying member movably mounted in each oscillating member; fingers connected with each carrying member;

means for synchronously actuating all of said carrying members; and independently actuated mechanism, in part outside of the oscillating member, for separately opening the fingers at the same time or different times at different stations.

10. In a transfer mechanism; a plurality of tool stations; an oscillating member movable about a center intermediate of each of said stations for transferring a workpiece from one station to another station; a crank shaft adjacent to each oscillating member; a carrying member movably mounted in each oscillating member and having an operative connection with a crank shaft and whereby a reciprocating movement is given to the carrying member and an oscillating movement to the oscillating member; and means for synchronously imparting a partial rotation to each of said crank shafts.

11. In a transfer mechanism; a plurality of tool stations; an oscillating member movable about a center intermediate of each of said stations for transferring a workpiece from one station to another station; a crank shaft adjacent to each oscillating member; a carrying member movably mounted in each oscillating member and having an operative connection with a crank shaft; means for synchronously imparting a partial rotation to each of said crank shafts; and means for connecting the crank shafts with the actuating mechanism, whereby the relative position of the several crank shafts about their axes may vary.

12. In a transfer mechanism; a plurality of tool stations; an oscillating member movable about a center intermediate of each of said stations for transferring a workpiece from one station to another station; a crank shaft adjacent to each oscillating member; a carrying member movably mounted in each oscillating member and having an operative connection with a crank shaft; means for synchronously imparting a partial rotation to each of said crank shafts; means for connecting the crank shafts with the actuating mechanism, whereby the relative position of the several shafts about their axes may vary, comprising in part a fixed member on some of said crank shafts; and a pinion secured to the fixed member so as to have relative adjustment about its axis.

13. In a transfer mechanism; a plurality of tool stations; an oscillating member movable about a center intermediate of each of said stations for transferring a workpiece from one station to another station; a rock shaft adjacent to each oscillating member, having a crank pin thereon; a carrying member movably mounted in each oscillating member and having an operative connection with a crank on one of the rock shafts; fingers connected with each carrying member; means for synchronously imparting a partial rotation to each rock shaft, said means permitting an independent adjustment of the relative position of each rock shaft about its axis and whereby the crank pin associated therewith may occupy different relative positions and said fingers moved into a predetermined position relative to the tools at the receiving and discharge stations.

14. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members and independently actuated mechanism for separately opening the fingers upon each carrying member, either at the same time or at different times at different stations, comprising in part gear and rack mechanism; and means for yieldingly resisting the movement of the rack mechanism near the limits of its stroke.

15. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members and independently actuated mechanism for separately actuating the fingers upon each carrying member, comprising in part a rock member for each carrying member, some of the rock members and oscillating members having a common center.

16. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members and independently actuated mechanism for separately actuating the fingers upon each carrying member, comprising in part a rock member for each carrying member, one of the rock members being journaled in a fixed part, and other of the rock members being journaled concentric with the oscillating members.

17. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members and independently actuated mechanism for separately actuating the fingers upon each carrying member, comprising in part a rock member for each carrying member; an intermediate member; and an operative connection between the intermediate member and each rock member.

18. In a transfer mechanism; a plurality of tool stations; an oscillating member movable about a center intermediate of each of said stations for transferring a workpiece from one station to another station; a carrying member movably mounted in each oscillating member; fingers connected with each carrying member; means for synchronously actuating all of said carrying members and independently actuated mechanism for separately actuating the fingers upon each carrying member, comprising in part a rock member for each carrying member; an intermediate member; and an adjustable connection between the intermediate member and each rock member.

19. In a transfer mechanism; a plurality of tool stations; an oscillating member movable about a center intermediate of each of said stations for transferring a workpiece from one station to another station; a carrying member movably mounted in each oscillating member; fingers connected with each carrying member;

means for synchronously actuating all of said carrying members and independently actuated mechanism for separately actuating the fingers upon each carrying member, comprising in part a rock member for each carrying member; an intermediate member; an operative connection between the intermediate member and each rock member; a cam; and a lever carrying the intermediate member actuated by the cam.

20. In a transfer mechanism; a plurality of transfer units, each unit having a head member; a carrying member thereon; fingers movably mounted upon the carrying member; means for synchronously moving the carrying member of each transfer unit relative to the head member and thereby actuating each head member; and independent means for separately actuating the fingers of each transfer unit, and whereby the extent of opening of the fingers may vary on different units.

21. In a transfer mechanism; a plurality of transfer units, each unit having a head member; a carrying member thereon; fingers movably mounted upon the carrying member; means for synchronously moving the carrying member of each transfer unit relative to the head member and thereby actuating each head member; and independent means for separately actuating the fingers of each transfer unit, and whereby the extent of opening of the fingers may vary on different units, comprising in part separating members of varying widths moving between finger parts.

22. In a transfer mechanism; a plurality of transfer units, each unit having a head member; a carrying member thereon; fingers movably mounted upon the carrying member; means for synchronously moving the carrying member of each transfer unit relative to the head member thereby actuating each head member; and independent means for separately actuating the fingers of each transfer unit, comprising in part a reciprocating member having a cam thereon movable into an open space between finger parts and thereby separating the same and opening fingers.

23. In a transfer mechanism; a plurality of transfer units, each unit having a head member; a carrying member thereon; fingers movably mounted upon the carrying member; means for synchronously moving the carrying member of each transfer unit relative to the head member thereby actuating each head member; and independent means for separately actuating the fingers of each transfer unit, comprising in part a reciprocating member having a cam thereon movable into an open space between finger parts and thereby separating the same and opening the fingers, the cam connected with one transfer unit opening the fingers a greater distance than the cam associated with another transfer unit.

24. In a transfer mechanism; a plurality of transfer units, each unit having a head member; a carrying member thereon; fingers movably mounted upon the carrying member; means for synchronously moving the carrying member of each transfer unit relative to the head member thereby actuating each head member; and independent means for separately actuating the fingers of each transfer unit, comprising in part a separate rock member for independently opening the fingers at each station, movable about an axis spaced from the oscillating member at one station and about an axis common to an oscillating member at other stations.

25. In a transfer mechanism; a plurality of transfer units, each unit having a head member; a carrying member thereon; fingers movably mounted upon the carrying member; means for synchronously moving the carrying member of each transfer unit relative to the head member thereby actuating each head member; and means, comprising in part a rock member, adjacent to each transfer unit, for independently opening the fingers at each station.

26. In a transfer mechanism; a plurality of transfer units, each unit having a head member; a carrying member thereon; fingers movably mounted upon the carrying member; means for synchronously moving the carrying member of each transfer unit relative to the head member thereby actuating each head member; means, comprising in part a rock member for independently opening the fingers at one station, movable about an axis spaced from the oscillating member.

27. In a transfer mechanism; a plurality of tool stations; an oscillating member movable about a center intermediate of each of said stations for transferring a workpiece from one station to another station; a carrying member movably mounted in each oscillating member; fingers connected with each carrying member; means, comprising in part gear and rack mechanism, for synchronously actuating all of said carrying members; independently actuated mechanism for separately opening the fingers; and means for adjustably varying the length of the stroke of the rack.

28. In a transfer mechanism; a plurality of transfer units, each unit having a head member; a carrying member thereon; fingers movably mounted upon the carrying member; and means for independently actuating each transfer unit separately and independently of other transfer units.

29. In a transfer mechanism; a plate adjustably secured to a fixed part; a plurality of transfer units movably mounted thereon, each unit having an oscillating head member; a carrying member thereon; fingers movably mounted upon the carrying member; means for synchronously moving each of the carrying members relatively to the respective head member and thereby oscillating the head members; and independent means movable in part with the head members for separating the fingers.

RICHARD LESTER WILCOX.
HERBERT L. HOYT.